US007633508B2

(12) United States Patent
Enami et al.

(10) Patent No.: US 7,633,508 B2
(45) Date of Patent: Dec. 15, 2009

(54) DATA TRANSFER APPARATUS

(75) Inventors: Eiji Enami, Kanagawa (JP); Keita Maejima, Kanagawa (JP); Hironobu Kurihara, Kanagawa (JP); Yuichi Yomogida, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 282 days.

(21) Appl. No.: 11/469,055

(22) Filed: Aug. 31, 2006

(65) Prior Publication Data

US 2007/0057961 A1 Mar. 15, 2007

(30) Foreign Application Priority Data

Sep. 15, 2005 (JP) ............................ 2005-269262

(51) Int. Cl.
*G06T 1/20* (2006.01)
*G06F 13/00* (2006.01)
*G09G 5/02* (2006.01)

(52) U.S. Cl. ....................... 345/600; 345/506; 345/537; 345/538

(58) Field of Classification Search ................. 345/538, 345/600, 506, 537
See application file for complete search history.

(56) References Cited

U.S. PATENT DOCUMENTS 4,688,033 A * 8/1987 Carini et al. ................ 345/560
4,779,084 A * 10/1988 Tanaka et al. ............... 345/574
4,839,828 A * 6/1989 Elsner et al. ................ 345/589
4,937,737 A * 6/1990 Schwane et al. ............ 719/310
5,570,242 A * 10/1996 Leonhardt et al. ............. 360/48
5,628,026 A * 5/1997 Baron et al. .................... 710/1
5,754,191 A * 5/1998 Mills et al. .................. 345/563
5,816,921 A * 10/1998 Hosokawa ................... 463/43
5,959,637 A * 9/1999 Mills et al. .................. 345/506
7,190,338 B2 * 3/2007 Kubota et al. ................. 345/89
7,330,188 B1 * 2/2008 Solanki et al. .............. 345/552

FOREIGN PATENT DOCUMENTS

JP 61-255456 11/1986
JP 8-63587 3/1996
JP 2003-15948 1/2003
JP 2003-157433 5/2003
JP 2004-343157 12/2004

* cited by examiner

*Primary Examiner*—M Good Johnson
(74) *Attorney, Agent, or Firm*—Oblon, Spivak, McClelland, Maier & Neustadt, L.L.P.

(57) ABSTRACT

A reference-data storing unit stores reference data for determining whether to display image data by overwriting display data. A data converting unit converts the image data into display image data. A transparency determining unit determines whether a first pixel value of the display image data obtained through a color conversion by the data converting unit coincides with a second pixel value of the reference data stored in the reference-data storing unit. A data transfer unit that transfers, when it is determined that the first pixel value coincides with the second pixel value, the display image data to a display address space.

8 Claims, 12 Drawing Sheets

DATA TRANSFER APPARATUS

CROSS-REFERENCE TO RELATED APPLICATIONS

The present document incorporates by reference the entire contents of Japanese priority document, 2005-269262 filed in Japan on Sep. 15, 2005.

BACKGROUND OF THE INVENTION

1. Field of the Invention

The present invention relates to a technology for performing a transparent processing in a data transfer apparatus.

2. Description of the Related Art

Conventionally, a display control apparatus that reads display image data and performs data output to a display panel have been generally known. Such a display control apparatus includes a micro control unit and a memory having stored therein image data, which serves as materials for display image data, final display data, or image data being edited. To allow an image to be displayed on the display panel, the display control apparatus reads the display image data at predetermined timing and outputs data to the display panel. In a display control system having such a display control apparatus connected thereto, when a display image is generated by combining and arranging image data stored in the memory and also a transparent transfer process is required, for the purpose of data transfer, it is effective to use a data transfer apparatus by hardware, rather than read and write of a CPU.

For such a process, a transparent-detection-data transfer control apparatus has been disclosed in Japanese Patent Laid-Open Publication No. 8-63587, in which, when data read from a predetermined address by using a transparent register storing transparent color coincides with a transparent-register set value, the apparatus performs a transparent transfer process with an operation of refraining from transferring that data.

However, in data transfer apparatuses for use in generating image data, not only a transparent function but also a palette conversion function is often required, in which an input color space is converted to another color space by using a Look-Up Table (LUT) for transfer. If a data transfer apparatus supports only a transparent function but not the palette transformation function, such a data transfer apparatus is useless and a transfer operation including the palette transformation process has to be performed by the CPU. This poses a problem of increasing a transfer process time.

SUMMARY OF THE INVENTION

It is an object of the present invention to at least partially solve the problems in the conventional technology.

A data transfer apparatus according to one aspect of the present invention includes a reference-data storing unit that stores reference data for determining, when an instruction to display image data stored in a predetermined address space on a same display position as a display position of other display data is received, whether to display the image data by overwriting the display data; a data converting unit that converts the image data into display image data; a transparency determining unit that determines whether a first pixel value of the display image data obtained through a color conversion by the data converting unit coincides with a second pixel value of the reference data stored in the reference-data storing unit; and a data transfer unit that transfers, when the transparency determining unit determines that the first pixel value coincides with the second pixel value, the display image data to the display address space.

A data transfer apparatus according to another aspect of the present invention includes an obtaining unit that obtains binary image data stored in a predetermined address space and color information for displaying the image data in color; a data converting unit that converts the image data obtained by the obtaining unit into display image data by using the color information; a transparency determining unit that determines whether the image data obtained by the obtaining unit coincides with a predetermined reference binary value; and a data transfer unit that transfers, when the transparency determining unit determines that the image data coincides with the reference binary value, the display image data obtained through a color conversion by the data converting unit to a display address space.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
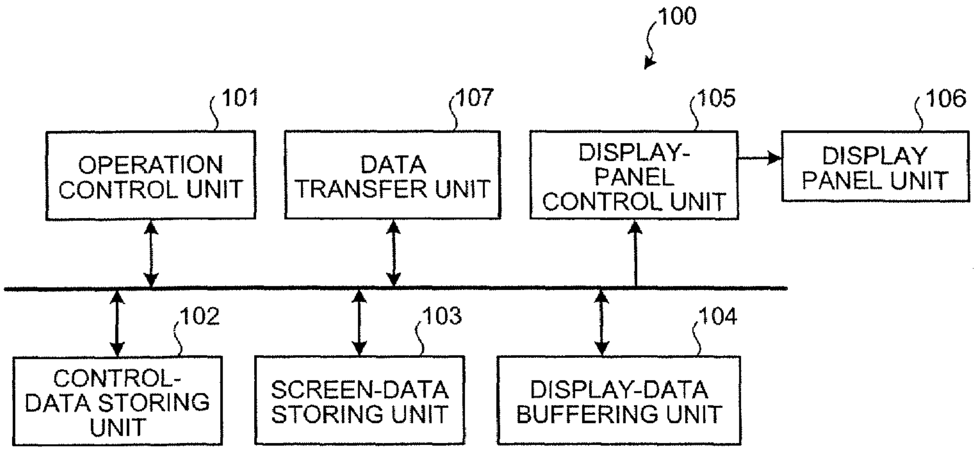
FIG. 1 is a block diagram depicting the structure of a display apparatus of a multifunction product including a data transfer unit according to an embodiment of the present invention.

First, an example of structure of a multifunction product including a data transfer unit to which the present invention is applied is explained. FIG. 1 is a block diagram depicting the structure of a display apparatus of a multifunction product including a data transfer unit according to the embodiment of the present invention. Although a multifunction product is used for explanation in the present embodiment, any devices other than such a processing machine will suffice, such as a copier, printer, scanner, or personal computer.

A multifunction product 100 according to the present embodiment includes an operation control unit 101, a control-data storing unit 102, a screen-data storing unit 103, a display-data buffering unit 104, a display-panel control unit 105, a display panel unit 106, and a data transfer unit 107.

The operation control unit 101 sequentially reads a control program stored in the control-data storing unit 102 to configure a display screen according to each of various conditions. The operation control unit 101 writes image data of the configured display screen in the screen-data storing unit 103. Here, the operation control unit 101 may directly write screen data of the display screen in the screen-data storing unit 103. Also, the operation control unit 101 may set transfer-source data and a transfer-destination address in the data transfer unit 107 and perform writing by using the data transfer unit 107.

The control-data storing unit 102 has stored mainly in a non-volatile memory a program describing operation control of the operation control unit 101. Also, font data for display and data of image parts for image configuration are included in a data area of the program, and are stored as a conversion-table input data of 1 bit per pixel or 4 to 8 bits per pixel. These pieces of data are also placed in the control-data storing unit 102, which is a non-volatile memory.

The screen-data storing unit 103 has stored therein screen data generated by the operation control unit 101. The image size of this screen data may be equal to the image size of the display panel unit 106, or may be a size of only a partial area of the display screen. For example, when a part of the display screen is used as a unit of generation, to configure final display-screen data, the generated pieces of screen data are combined to configure one piece of display-screen data for transfer to the display-data buffering unit 104. When the size of the generated screen data is equal to the display screen size and all images to be displayed are included, the screen data is transferred as it is to the display-data buffering unit 104.

The data transfer unit 107 performs a data conversion process or a transparent process on the image data obtained from the operation control unit 101, and then transfers the results to the screen-data storing unit 103 or the display-data buffering unit 104. From the operation control unit 101, settings of a transfer-source address, a transfer-destination address, a transfer width, the number of transfer lines, and others are received. With these, the data transfer unit 107 transfers the image data stored in the control-data storing unit 102 to an address range set in the screen-data storing unit 103 or the display-data buffering unit 104. Alternatively, the image data stored in the screen-data storing unit 103 to an address range set in the display-data buffering unit 104. Also, when the transfer-source image data is stored in a form of conversion-table input data, a data conversion table of the data transfer unit 107 is used for bit extension so as to make conversion to an image data format that can be handled by the display-panel control unit 105 for transfer.

The display-data buffering unit 104 retains the screen data transferred from the screen-data storing unit 103, and then outputs data base on regular reading from the display-panel control unit 105. The display-data buffering unit 104 has stored therein image data of transparent process results from the data transfer unit 107. For example, an image determined in the transparent process to be written is stored in a state of overwriting a lower-written image.

Also, to prevent a disturbance in the display screen at the time of updating the screen, the display-data buffering unit 104 has a double-buffer structure, in which the display-data buffering unit has two data storage areas and writes data in one area from which data is not read by the display-panel control unit 105 and, after the end of writing, changes the area read by the display-panel control unit 105 to a data-updated area.

The display-panel control unit 105 reads data from the display-data buffering unit 104 based on a display frequency of the display panel unit 106, that is, a data update speed, adjusts a data format to that of an interface (I/F) for display panel, and outputs the data to the display panel unit 106.

The display panel unit 106 displays data for display panel output from the display-panel control unit 105. With this, the image determined to be written in a transparent process of the data transfer unit 107 is displayed on the display panel in a state of overwriting a bottom image.

Figure 2:
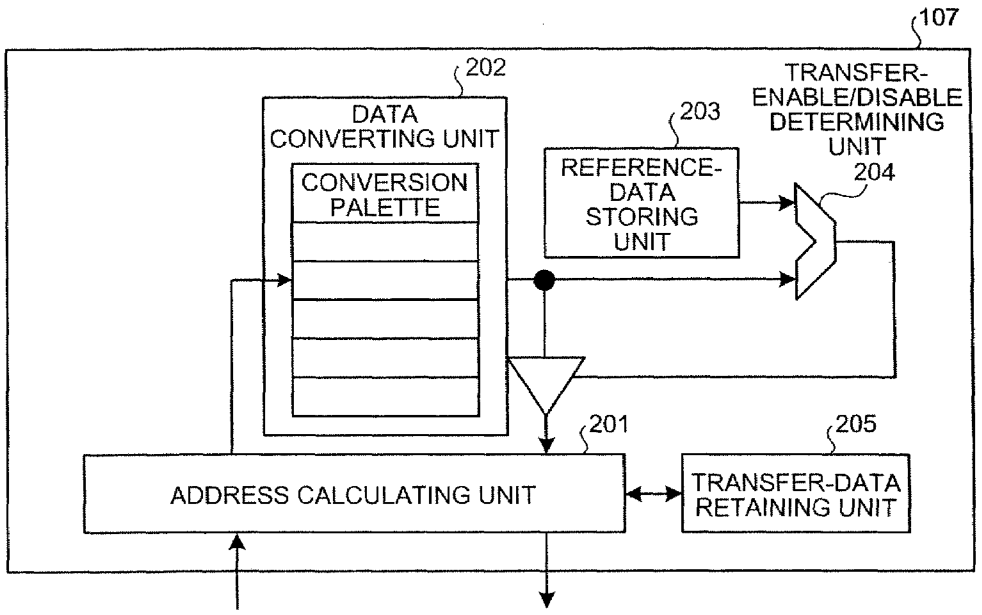
FIG. 2 is a block diagram depicting the structure of the data transfer unit according to the present embodiment.

FIG. 2 is a block diagram depicting the structure of the data transfer unit according to the present embodiment. The data transfer unit 107 according to the present embodiment includes an address calculating unit 201, a data converting unit 202, a reference-data storing unit 203, a transfer-enable/disable determining unit 204, and a transfer-data retaining unit 205.

The address calculating unit 201 calculates an address of the image data for data conversion and transparent processes, reading image data corresponding to the calculated address from the operation control unit 101 and writing display image data in the calculated address in the screen-data storing unit 103 or the display-data buffering unit 104. The address calculating unit 201 forms data transfer unit according to the present invention.

The data converting unit 202 converts the image data read by an address calculating unit 201 to display data by using a data conversion table (hereinafter, conversion palette). The reference-data storing unit 203 stores reference data in transfer enable/disable determination. Here, the reference data serves as criteria for determining whether to perform a transparent process on each pixel, and is set with, for example, a pixel value of a predetermined color.

The transfer-enable/disable determining unit 204 compares the image data obtained through conversion by the data converting unit 202 and the reference data stored in the reference-data storing unit 203 and, when these pieces of data coincide with each other, causes the image data to be stored in the transfer-data retaining unit 205. Here, the image data may be input data not converted by the data converting unit 202.

The transfer-data retaining unit 205 retains image data determined by the transfer-enable/disable determining unit 204 to be transferred.

Figure 3:
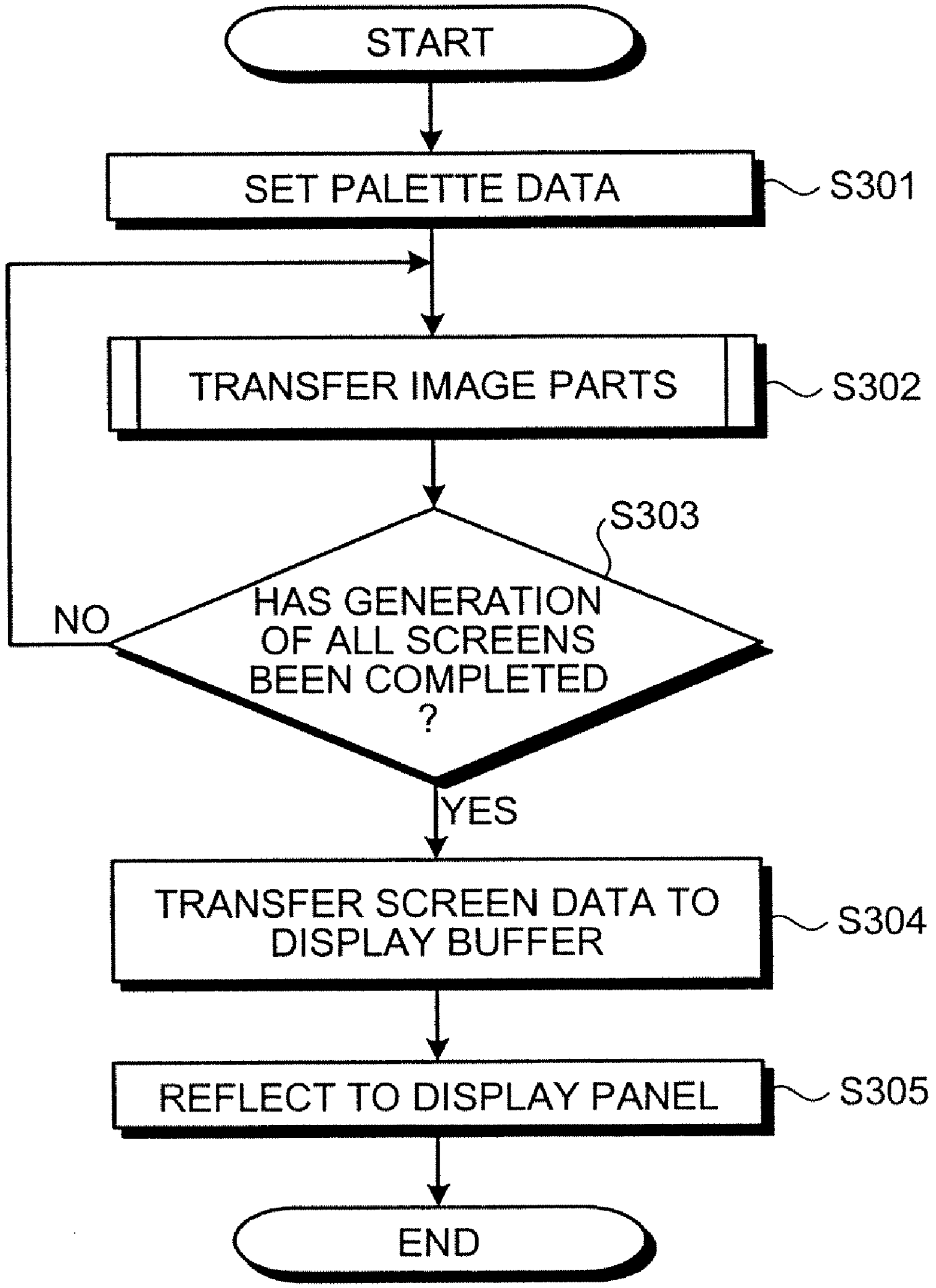
FIG. 3 is a flowchart of an image display procedure to be performed by an operation control unit, a display-panel control unit, a display panel unit, and the data transfer unit.

An image display process by the multifunction product 100 is now explained. FIG. 3 is a flowchart of an image display procedure to be performed by the operation control unit, the display-panel control unit, the display panel unit, and the data transfer unit.

The operation control unit 101 operates according to a control program stored in the control-data storing unit 102 to generate a display screen based on a system condition. Description is now made to the case where data of a rectangular image part, which is part of the screen structure, is transferred to the control-data storing unit 102 when a destination of display screen data generated is the screen-data storing unit 103.

It is also assumed that the data of image parts is stored in the control-data storing unit 102 as 256 pieces of 8-bit palette input data, and is converted to data for 65,536 colors of 16 bits that can be handled by the display-panel control unit 105 for transfer to the screen-data storing unit 103.

First, prior to generation of a display screen, the operation control unit 101 sets palette table data for conversion of 8-bit input to 16-bit output in the data converting unit 202 of the data transfer unit 107 (step S301). In general, this palette data is not rewritten in the course of configuring one screen. Alternatively, a plurality of palette conversion outputs may be mixed by setting another palette table for one portion of the palette data.

After setting the palette data, a process of transferring data of image parts based on the screen structure to be generated (step S302). Details of this process will be explained further below by using FIG. 4. Here, a display screen may be generated not only through transfer of image data, but also by the operation control unit 101 directly writing on the screen-data storing unit 103 for rendering process.

It is then determined whether all screens have been generated (step S303). If it is determined that not all screens have been generated ("NO" at step S303), the procedure returns to step S302. If it is determined that all screens have been generated ("YES" at step S303), that is, after transfer, transfer of screen structure data is performed for all portions on the display screen. When generation of display screen data in the screen-data storing unit 103 is completed, the display-panel control unit 105 transfers the generated screen data to the display-data buffering unit 104 (step S304). The display-panel control unit 105 then reflects the image data on the display panel (step S305). That is, a switch is made to a screen data area in which a display data area is newly created. With this, the newly-generated screen data is read to the display-panel control unit 105 and is then displayed on the display panel unit 106.

Figure 4:
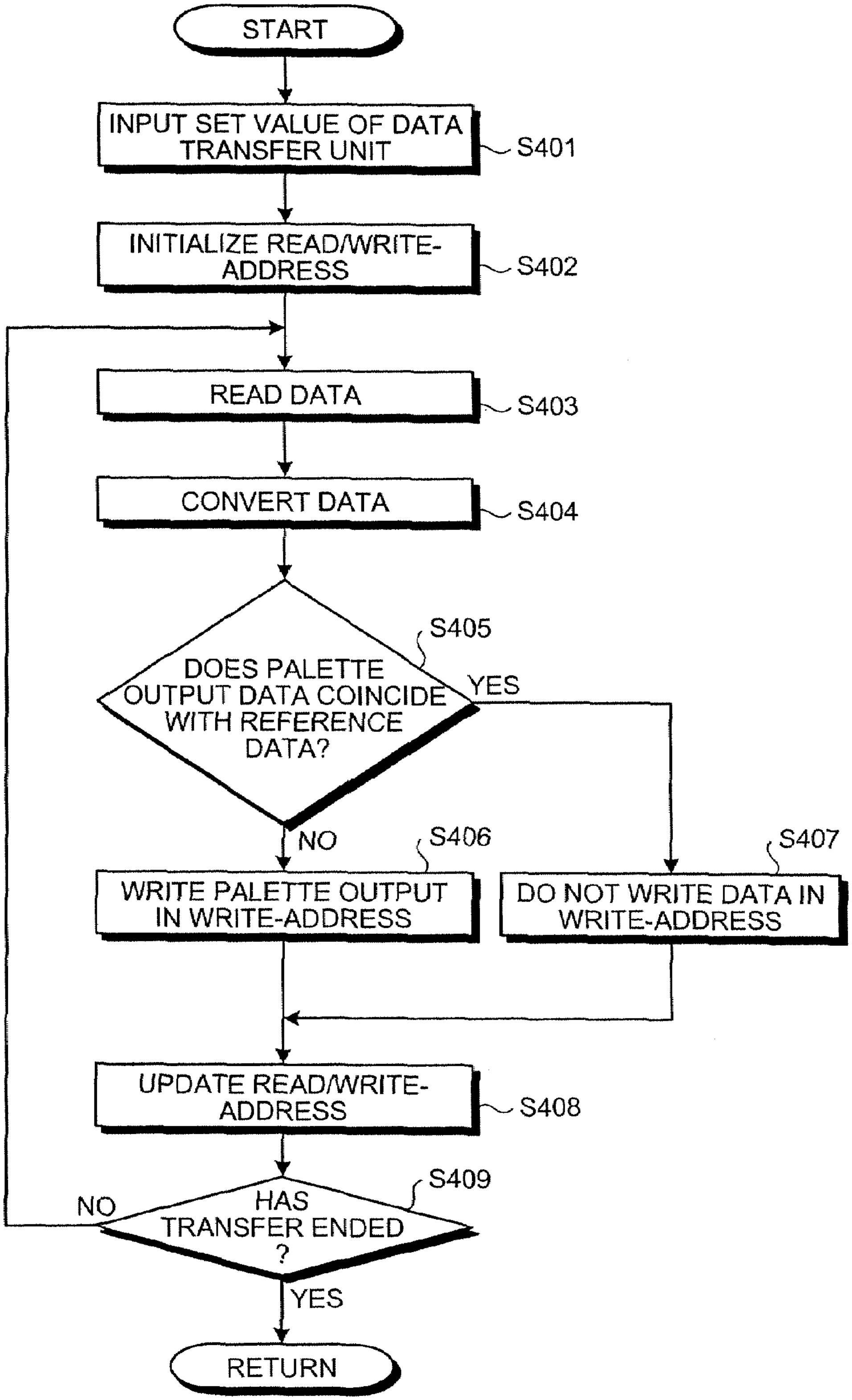
FIG. 4 is a flowchart of a procedure of a data transfer process to be performed by an address calculating unit, a data converting unit, and a transfer-enable/disable determining unit.

A data transfer process by the structured data transfer unit is now explained. FIG. 4 is a flowchart of a procedure of a data transfer process to be performed by the address calculating unit, the data converting unit, and the transfer-enable/disable determining unit.

The data transfer unit 107 sets a transfer-source data-read start address, a transfer-source data transfer width, a transfer-source data folding width, a transfer-destination data-write start address, a transfer-destination data-area folding width, and the number of transfer lines (step S401).

The address calculating unit 201 initializes a read-address register and a write-address register (step S402). The address calculating unit 210 calculates the value of the read-address register, and then reads image data indicated by the read-address register (step S403). Here, the read image data is stored in the control-data storing unit 102 and the screen-data storing unit 103. The control-data storing unit 102 and the screen-data storing unit 103 form a predetermined address space according to the present invention. Here, the predetermined address space is an area in which image data is stored, and the image data includes at least positional information and color information, such as a pixel value.

The data converting unit 202 converts the read image data to display image data (step S404). Specifically, with the read image data being an address, a conversion process is performed by using conversion palette data, and then the display image data is output.

The transfer-enable/disable determining unit 204 determines whether the display image data coincides with transparent data (step S405). Specifically, it is determined whether a value of the display image data obtained through conversion by the data converting unit 202 coincides with a value of reference data stored in the reference-data storing unit 203. Here, the value of the display image data is a pixel value, such as an RGB value and, similarly, the value of the reference data is a pixel value such as an RGB value.

When it is determined that the display image data does not coincide with the reference data ("NO" at step S405), the display image data is written at an address indicated by the write-address register (step S406). When it is determined that the display image data coincides with the reference data ("YES" at step S405), the display image data is not written at the address indicated by the write-address register (step S407). With this, the display image data coinciding with the reference data is not written. Therefore, for example, when the reference data has a pixel value representing blue, a lower-written image is displayed at a position with a blue pixel value in the display image data.

The address calculating unit 201 updates the value of the read-address register and the write-address register (step S408). With this, in the address calculating unit 201, the value of the read-address register and the value of the write-address register are sequentially added, thereby causing a transfer process to sequentially proceed.

It is then determined whether transfer has ended (step S409). Here the display image data is transferred to the screen-data storing unit 103 or a display-data buffering unit 140. The screen-data storing unit 103 or the display-data buffering unit 140 form a display address space according to the present invention. Here, the display address space is an area in which the display image data is stored, and the display image data includes at least positional information and color information, such as a pixel value.

When it is determined that transfer has not ended ("NO" at step S409), the procedure returns to step S403 for reading image data. When it is determined that transfer has ended ("YES" at step S409), the process ends.

Also, in a transparent process (step S405 to step S407), the process is performed based on the value of a transparent-process operation setting register. If the transparent-process operation setting register is set not to perform a transparent process, the transparent process is not performed, and all pieces of read image data are written in the transfer destination.

As such, the data conversion process and the transparent process can be performed as a series of processes. Therefore, in comparison with the case in which the data conversion process and the transparent process are individually performed, processing can be performed at high speed.

In the present embodiment, the display image data is written when it is determined that the display image data does not coincide with the reference data, whilst the display image data is not written when it is determined that the display image data coincides with the reference data. Conversely, the display image data may not be written when it is determined that the display image data does not coincide with the reference data, whilst the display image data is written when it is determined that the display image data coincides with the reference data.

Figure 5:
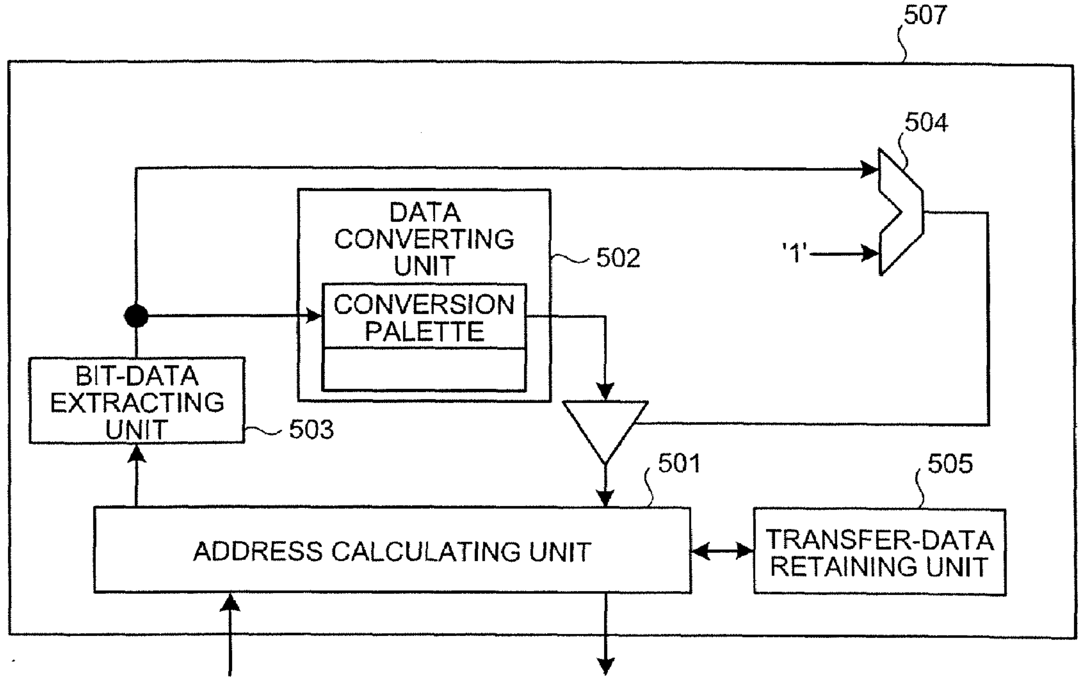
FIG. 5 is a diagram explaining an example of the structure of the data transfer unit for supporting one-bit data input.

As another example, a data transfer process when input data is of one bit is explained. FIG. 5 is a diagram explaining an example of the structure of the data transfer unit for supporting one-bit data input. In place of the data transfer unit 107 of FIG. 1 according to the embodiment, a data transfer unit 507 is included.

The data transfer unit 507 further includes a bit-data extracting unit 503 and a number-of-input-data-bits setting register. Based on the write-address, the bit-data extracting unit 503 sequentially extracts one bit from input data composed of a plurality of bits read from the screen-data storing unit 103. A transfer-enable/disable determining unit 504 performs a transfer process only when the value of the input data extracted by units of one bit coincides with a predetermined reference value, for example, 1. Here, the reference value is a value for determining whether to perform a transparent process, and is set as 1 or 0. Such a reference value is obtained by an obtaining unit not shown, and is then set. A data converting unit 502 performs data conversion, with data of one bit extracted by the bit-data extracting unit 503 as an input. The read-address is shifted to the next address after a transfer process on all read bits in units of transfer has been completed.

In this example, it is assumed that what is processed includes, for example, font data in which one pixel corresponds to one bit. In this case, since data corresponding to one pixel is binary data, 1 or 0 is set to the reference value for writing in portions of white pixels (or black pixels) and not writing in portions of other pixels, thereby achieving a transparent process. Also, in a data conversion process at the data converting unit 502, the obtained color information is used to convert, for example, one black pixel to one red pixel. Even if the input data is of one-bit one-pixel type, output data after conversion is not necessarily of one bit, but may include 16-bit color information, for example.

With this, whether a transparent process is enabled or disabled can be determined by determining whether the input data indicates 1. Therefore, it is not required to set reference data, and the operation load when the input data is of one bit can be reduced. Also, the transparent transfer process can support a one-pixel one-bit format, such as font data.

Here, in the present embodiment, the transfer-enable/disable determining unit 504 determines whether to perform a transfer process by comparing the input data with 1. Alternatively, in place of 1, the reference value may be set as 0. Whether the reference value is set as 1 or 0 can be selected depending on designs of image data generation, the data transfer apparatus, and the system.

Figure 6:
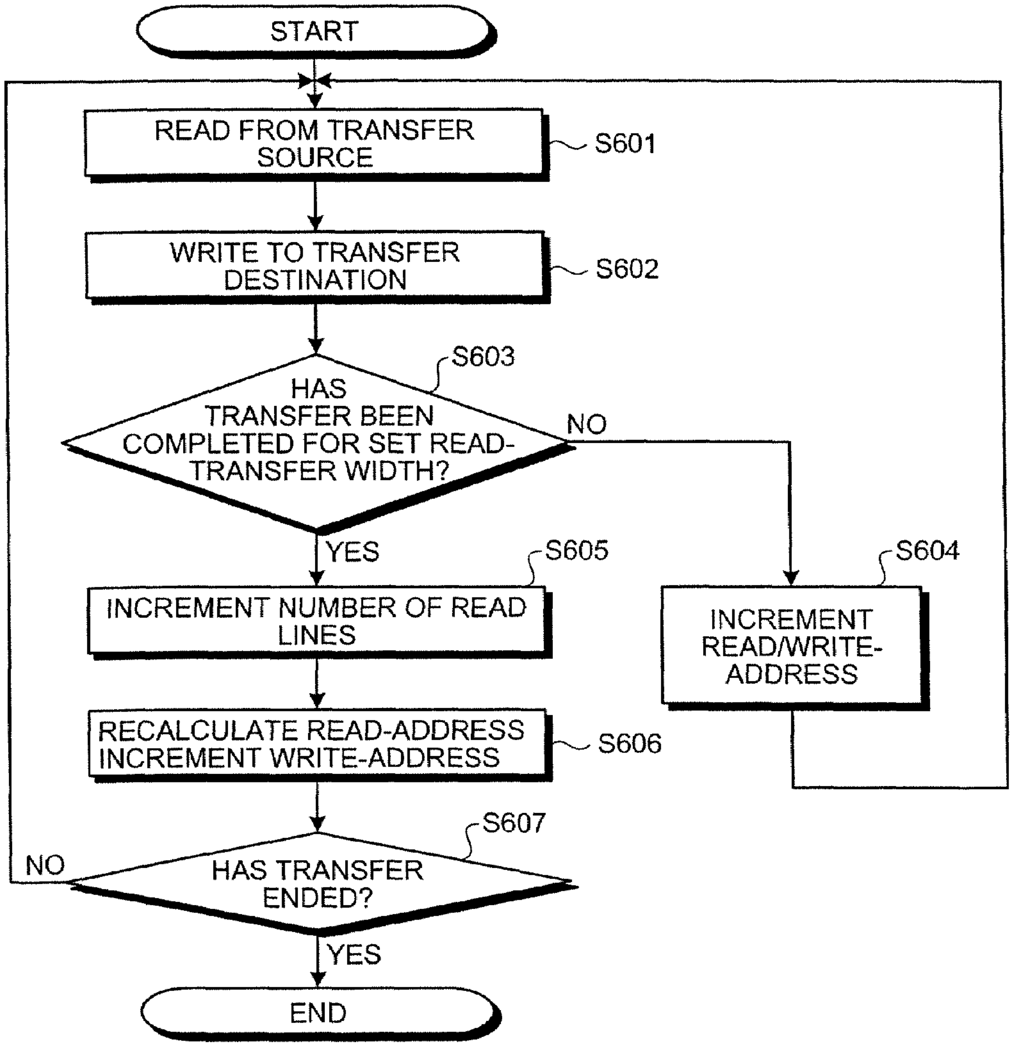
FIG. 6 is a flowchart depicting a procedure of an address calculation process in rectangle clipping.
Figure 7:
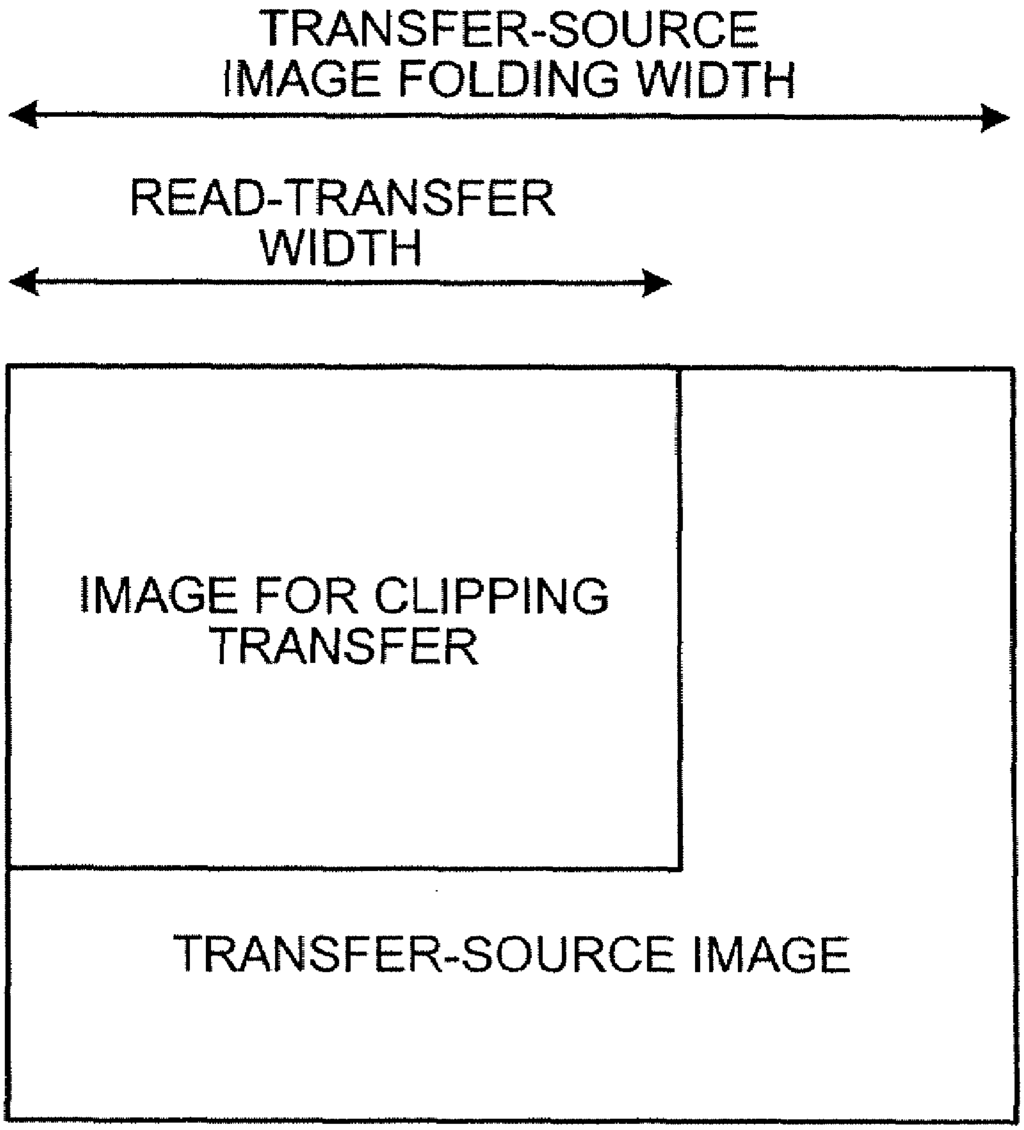
FIG. 7 is a diagram for explaining an example of a positional relation of an image for clipping transfer with respect to a transfer-source image.

Next, an address process in rectangle clipping to be performed by the address calculating unit 201 is explained. FIG. 6 is a flowchart depicting a procedure of address calculation process in rectangle clipping to be performed by the address calculating unit. In this explanation, the address calculation process in image reading from step S403 to step S409 in FIG. 4 is explained in detail. FIG. 7 is a diagram for explaining an example of a positional relation of an image for clipping transfer with respect to a transfer-source image. Here, a transfer-source data-read start address, a read-transfer width, a transfer-source image folding width, and the number of transfer lines are set in step S401 of FIG. 4.

The address calculating unit 201 reads image data from the transfer source (step S601). Then, the data conversion process and transparent process are performed. The display image data is then written in the transfer destination (step S602). When the read-address is shifted to one by one for each unit of transfer, it is determined whether the read-address has reached an address set at the read-transfer-width register (step S603).

If it is determined that the read-address has not reached the address set at the read-transfer-width register ("NO" at step S603), the value of the read-address register and the value of the write-address register are incremented (step S604). With this, the next the read-address and the next write-address are calculated. The procedure then returns to step S601 for continuously reading image data.

If it is determined that the read-address has reached the address set at the read-transfer-width register ("YES" at step S603), 1 is added to the number of read lines (step S605). The address calculating unit 201 then recalculates the value of the read-address register and increments the value of the write register (step S606). Specifically, the value of the read-address register is recalculated by adding to the read start address a value obtained by multiplying the number of read lines by the address width set in the transfer-source image-folding-width register, and then the resultant value is stored in the read-address register. With this, in FIG. 7, a rectangular area representing an image for clipping transfer in the transfer-source image can be read.

The address calculating unit 201 then determines whether transfer has ended (step S607). If it is determined that transfer has ended ("YES" at step S607), the procedure ends. If it is determined that transfer has not ended ("NO" at step S607), the procedure returns to S601 for continuously reading image data.

In this manner, by using the read-transfer-width register, even if the transfer-source image area is smaller than a work area retained in the data transfer unit, image data can be read as that of a small rectangular area. Therefore, the memory capacity of the work area can be reduced.

Figure 8:
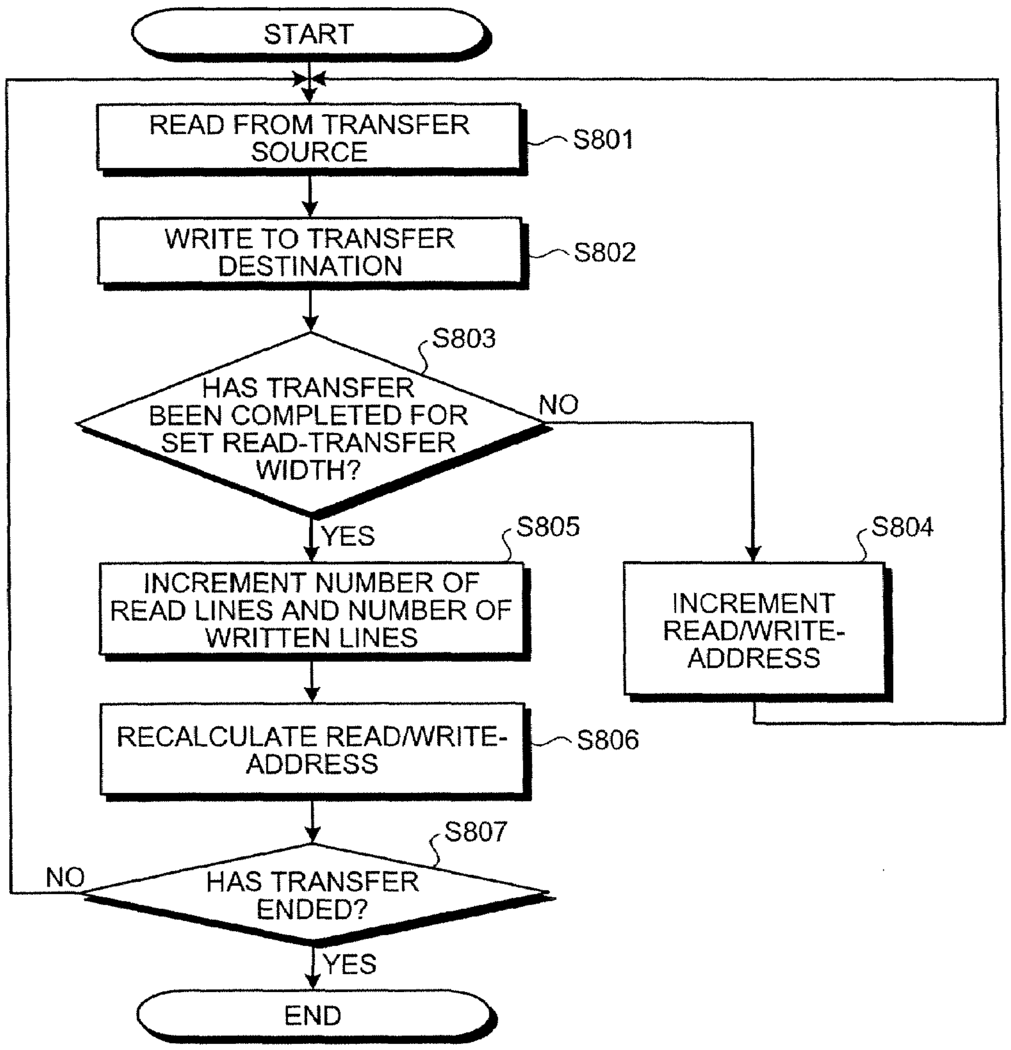
FIG. 8 is a flowchart depicting a procedure of an address calculation process in rectangle pasting to be performed by the address calculating unit.
Figure 9:
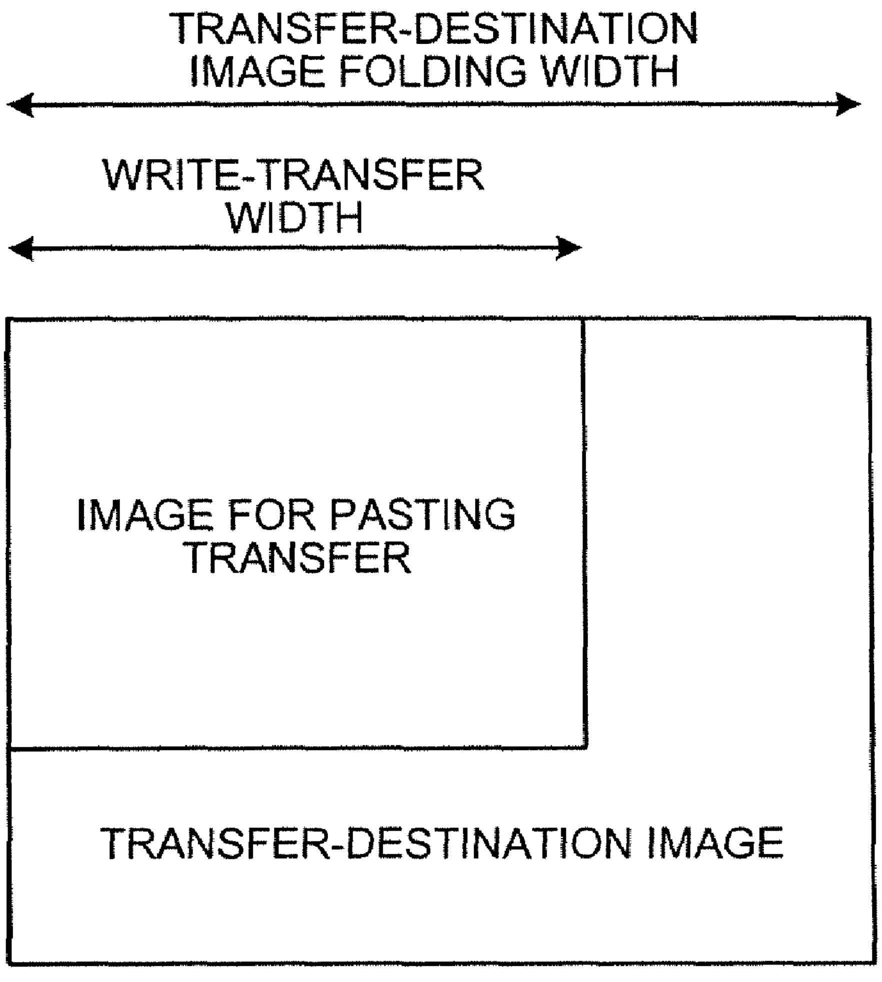
FIG. 9 is a diagram for explaining an example of a positional relation of an image for pasting and transfer with respect to a transfer-source image.

Next, an address process in rectangle pasting to be performed by the address calculating unit 201 is explained. FIG. 8 is a flowchart depicting a procedure of address calculation process in rectangle pasting to be performed by the address calculating unit. In this explanation, the address calculation process in image writing from step S403 to step S409 in FIG. 4 is explained in detail. FIG. 9 is a diagram for explaining an example of a positional relation of an image for pasting and transfer with respect to the transfer-destination image. Here, a transfer-destination data-write start address, a write-transfer width, a transfer-destination image folding width, and the number of transfer lines are set in step S401 of FIG. 4.

The address calculating unit 201 reads image data from the transfer source (step S801). Then, the data conversion process and transparent process are performed. The display image data is then written in the transfer destination (step S802). When the write-address is shifted to one by one for each unit of transfer, it is determined whether the write-address has reached an address set at the write-transfer-width register (step S803).

If it is determined that the write-address has not reached the address set at the write-transfer-width register ("NO" at step S803), the value of the read-address register and the value of the write-address register are incremented (step S804). With this, the next the read-address and the next write-address are calculated. The procedure then returns to step S801 for continuously reading image data.

If it is determined that the write-address has reached the address set at the write-transfer-width register ("YES" at step S803), 1 is added to the number of read lines and the number of written lines (step S805). The address calculating unit 201 then recalculates the value of the read-address register and the value of the write register (step S806). Specifically, the value of the write-address register is recalculated by adding to the write start address a value obtained by multiplying the number of written lines by the address width set in the transfer-destination image-folding-width register, and then the resultant value is stored in the write-address register. With this, in FIG. 7, a rectangular area representing an image for clipping transfer in the transfer-source image can be read.

The address calculating unit 201 then determines whether transfer has ended (step S807). If it is determined that transfer has ended ("YES" at step S807), the procedure ends. If it is determined that transfer has not ended ("NO" at step S807), the procedure returns to S801 for continuously reading image data.

In this manner, by using the write-transfer-width register, even if the display image area at the transfer destination is smaller than the work area retained in the data transfer unit, image data can be written as image data of a small rectangular area. Therefore, the memory capacity of the work area can be reduced.

Figure 10:
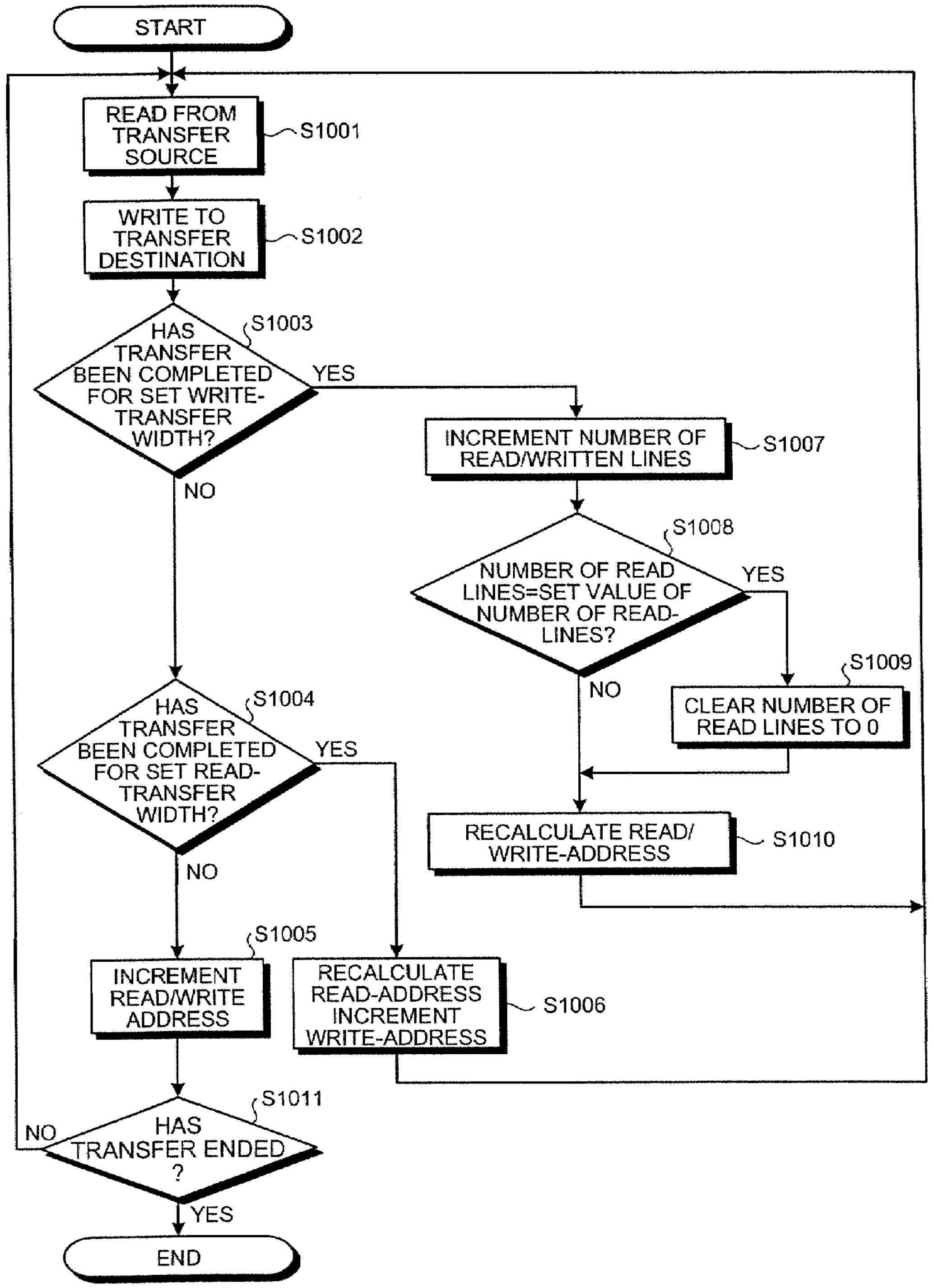
FIG. 10 is a flowchart of a procedure of an address calculation process in rectangle clipping and rectangle pasting to be performed by an address calculating unit.
Figure 11:
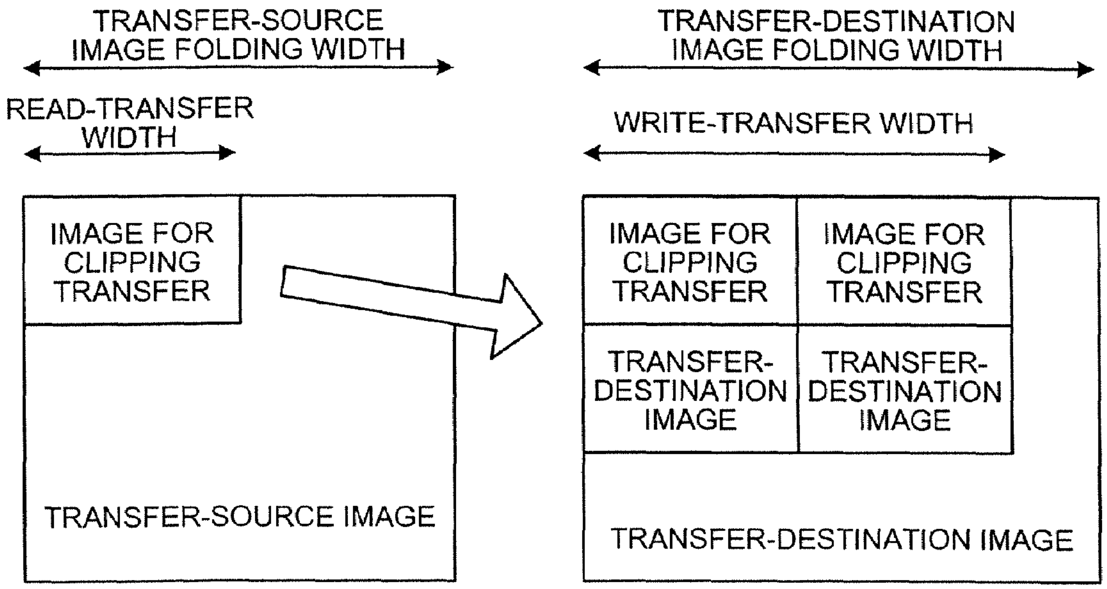
FIG. 11 is a diagram for explaining an example of a positional relation of an image for clipping transfer with respect to the transfer-source image and an image for pasting and transfer with respect to the transfer-destination image.

Also, in practice, instead of separately using rectangle clipping transfer and rectangle pasting and transfer, it is effective to combing these for repetitive rectangle transfer. Next, an address process in rectangle clipping and rectangle pasting to be performed by the address calculating unit 201 is explained. FIG. 10 is a flowchart depicting a procedure of address calculation process in rectangle clipping and rectangle pasting to be performed by the address calculating unit. In this explanation, the address calculation process in image reading and writing from step S403 to step S409 in FIG. 4 is explained in detail. FIG. 11 is a diagram for explaining an example of a positional relation of an image for clipping transfer with respect to the transfer-source image and an image for pasting and transfer with respect to the transfer-destination image. Here, the transfer-source data-read start address, the read-transfer width, the transfer-source image folding width, the transfer-destination data-write start address, the write-transfer width, the transfer-destination image folding width, and the number of transfer lines are set in step S401 of FIG. 4.

The address calculating unit 201 reads image data from the transfer source (step S1001). Then, the data conversion process and transparent process are performed. The display image data is then written in the transfer destination (step S1002). It is then determined whether the write-address has reached an address set at the write-transfer-width register (step S1003).

If it is determined that the write-address has not reached the address set at the write-transfer-width register ("NO" at step S1003), it is then determined whether the read-address has reached an address set at the read-transfer-width register (step S1004). If it is determined that the read-address has reached the address set at the read-transfer-width register ("YES" at step S1004), the value of the read-address register is recalculated, and the value of the write-address register is incremented (step S1006). The procedure then returns to step S1001.

If it is determined that the read-address has not reached the address set at the read-transfer-width register ("NO" at step S1004), the value of the read-address register and the value of the write-address register are incremented (step S1005). The address calculating unit 201 then determines whether transfer has ended (step S1011). If it is determined that transfer has ended ("YES" at step S1011), the procedure ends. If it is determined that transfer has not ended ("NO" at step S1011), the procedure returns to S1001 for continuously reading image data.

If it is determined in step S1003 that the write-address has reached the address set at the write-transfer-width register ("YES" at step S1003), the number of read lines and the number of written lines are incremented (step S1007). That is, if the number of times of transfer for one line has reached the number of times set in the write-transfer-width register, 1 is added to the number of read lines and the number of written lines.

It is then determined whether the number of read lines coincides with the set value of the number-of-read-line register (step S1008). If it is determined that the number of read lines coincides with the set value of the number-of-read-line register ("YES" at step S1008), 0 is set to the number of read lines (step S1009). If it is determined that the number of read lines does not coincide with the set value of the number-of-read-line register ("NO" at step S1008), the procedure goes to step S1010.

The address calculating unit 201 then recalculates the value of the read-address register and the value of the write-address register (step S1010). Specifically, a value obtained by multiplying the number of read lines by the address width set in the transfer-source image-folding-width register is added to the read start address and then the resultant value is taken as the next the read-address. Also, a value obtained by multiplying the number of written lines by the address width set in the transfer-destination image-folding-width register is added to the write start address and then the resultant value is taken as the next write-address. The procedure then returns to step S1001.

In this manner, by using the read-transfer-width register and the write-transfer-width register, even if the transfer-source image area is smaller than a work area retained in the data transfer unit or the display image area at the transfer destination is smaller than the work area retained in the data transfer unit, image data can be read or written as image data of a small rectangular area. Therefore, the memory capacity of the work area can be reduced.

Also, the transfer-data retaining unit 205 may have a structure in which, in a repetitive process, a plurality of pieces of write data at the time of transfer may be associated with the read-addresses. In such a case, the read data is sequentially stored in the transfer-data retaining unit 205. In a series of transfer processes, if the read-address is an address for which a read operation has been performed, a transfer operation is performed such that the read-address is replaced by a corresponding address in the transfer-data retaining unit 205 and output data from the transfer-data retaining unit 205 is taken as input data to the data transfer unit 107.

Figure 12:
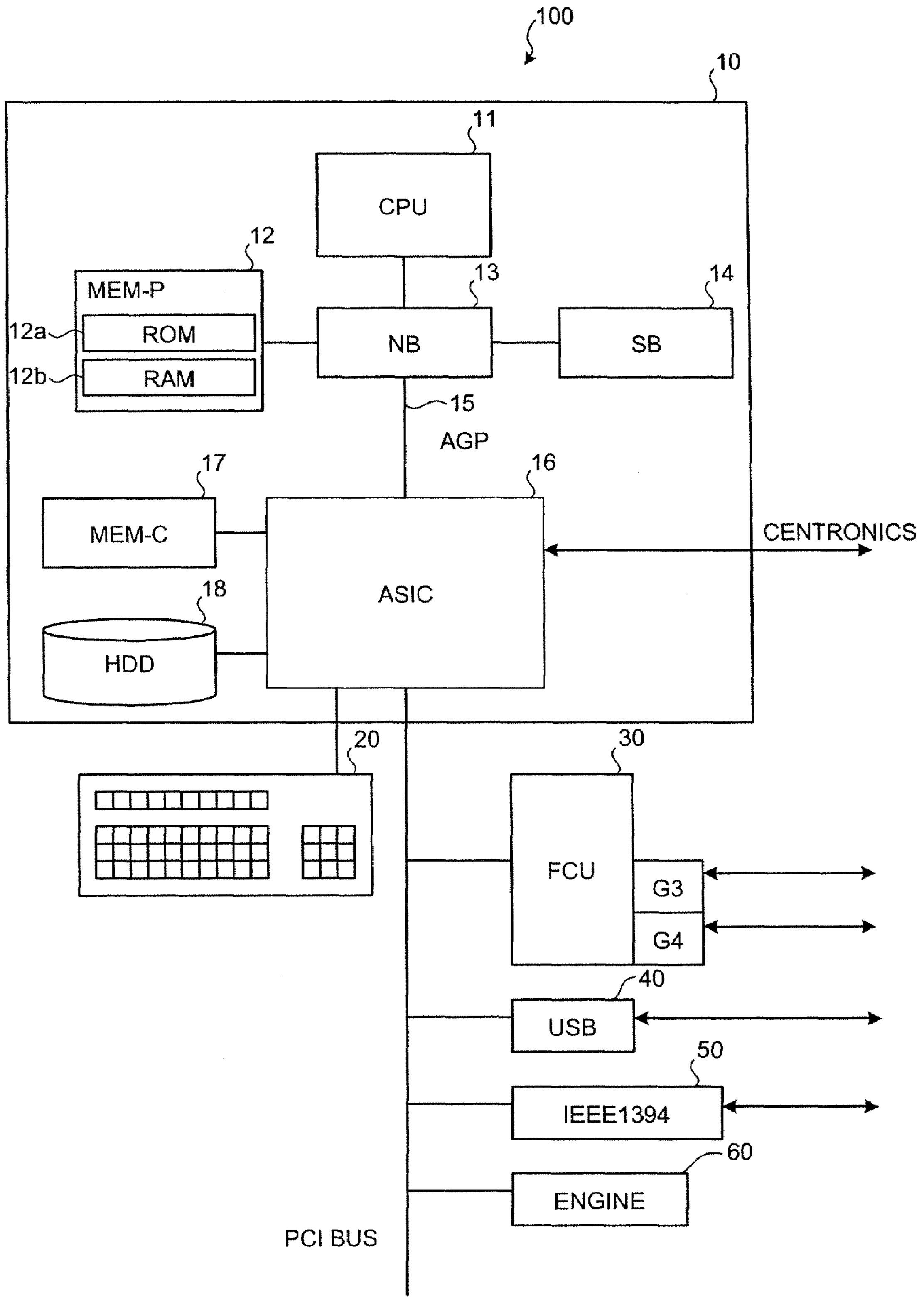
FIG. 12 is a block diagram depicting the hardware structure of a multifunction product according to the present embodiment.

FIG. 12 is a block diagram depicting the hardware structure of the multifunction product 100 according to the present embodiment. As shown in the drawing, the multifunction product 100 has a structure in which a control unit 10 and an engine unit 60 are connected to each other via a Peripheral Component Interconnect (PCI) bus. The control unit 10 is a control unit that controls the entire multifunction product 100, rendering, communications, and inputs from an operating unit 20. The engine unit 60 is typically a printer engine connectable to the PCI bus and, for example, is a black-and-white plotter, a one-drum color plotter, four-drum color plotter, a scanner, or a fax unit. Here, the engine unit 60 includes, in addition to an engine portion, such as a plotter, an image processing portion, such as error diffusion and gamma transformation.

The control unit 10 includes a central processing unit (CPU) 11, a north bridge (NB) 13, a system memory (hereinafter, MEM-P) 12, a south bridge (SB) 14, a local memory (hereinafter, MEM-C) 17, an Application Specific Integrated Circuit (ASIC) 16, and a hard disk drive (HDD) 18, wherein the NB 13 and the ASIC 16 are connected together via an Accelerated Graphics Port (AGP) bus 15. Also, the MEM-P 12 further includes a Read Only Memory (ROM) 12*a* and a Random Access Memory (RAM) 12*b*.

The CPU 11 controls the entire multifunction product 100, includes a chip set composed of the NB 13, the MEM-P 12, and the SB 14, and is connected to other devices through this chip set.

The NB 13 is a bridge for connecting the CPU 11 to the MEM-P 12, the SB 14, and the AGP bus 15, and includes a memory control unit that controls read from and write to the MEM-P 12, a PCI master, and an AGP target.

The MEM-P 12 is a system memory for use as, for example, a memory for storing programs and data, a memory for developing programs and data, or a rendering memory for printer, and includes the ROM 12*a* and the RAM 12*b*. The ROM 12*a* is a read-only memory for use as a memory for storing programs and data, whilst the RAM 12*b* is a writable and readable memory for use as, for example, a rendering memory for printer.

The SB 14 is a bridge for connecting the NB 13 to PCI devices and peripheral devices. The SB 14 is also connected to the NB 13 via the PCI bus. To this PCI bus, a network interface (I/F) unit and others are also connected.

The ASIC 16 is an Integrated Circuit (IC) for image processing including hardware elements for image processing, and serves as a bridge for connecting the AGP bus 15, the PCI bus, the HDD 18, and the MEM-C 17 together. The ASIC 16 includes a PCI target and an AGP master, an arbiter (ARB) forming the core of the ASIC 16, a memory control unit that controls the MEM-C 17, a plurality of Direct Memory Access Control units (DMACs) that performs, for example, rotation of image data through a hardware logic, and a PCI unit that performs data transfer with the engine unit 60 via the PCI bus. To the ASIC 16, a Fax Control Unit (FCU) 30, a Universal Serial Bus (USB) 40, the Institute of Electrical and Electronics Engineers 1394 (IEEE 1394) interface 50 are connected via the PCI bus.

The MEM-C 17 is a local memory for use as an image buffer for copy or a code buffer. The HDD 18 is a storage for storing image data, programs, font data, and forms.

The AGP bus 15 is a bus interface for graphics accelerator card suggested to increase the speed of graphics processing. By accessing to the MEM-P 12 with a high throughput, the AGP bus 15 can increase the speed of the graphics accelerator card.

The present invention is not meant to be restricted to the structure explained above, but can be applied to the structure in which the transfer-source image data is stored not in the control-data storing unit 102 but in the screen-data storing unit 103 in which the transfer-destination data is stored. In this case, the read-address and the write-address of the data transfer unit 107 both indicate the screen-data storing unit 103. In this case, the transfer-source image previously transferred by the data transfer unit 107 from the control-data storing unit 102 may be used. Alternatively, image data directly rendered by the operation control unit 101 may be used.

Figure 13:
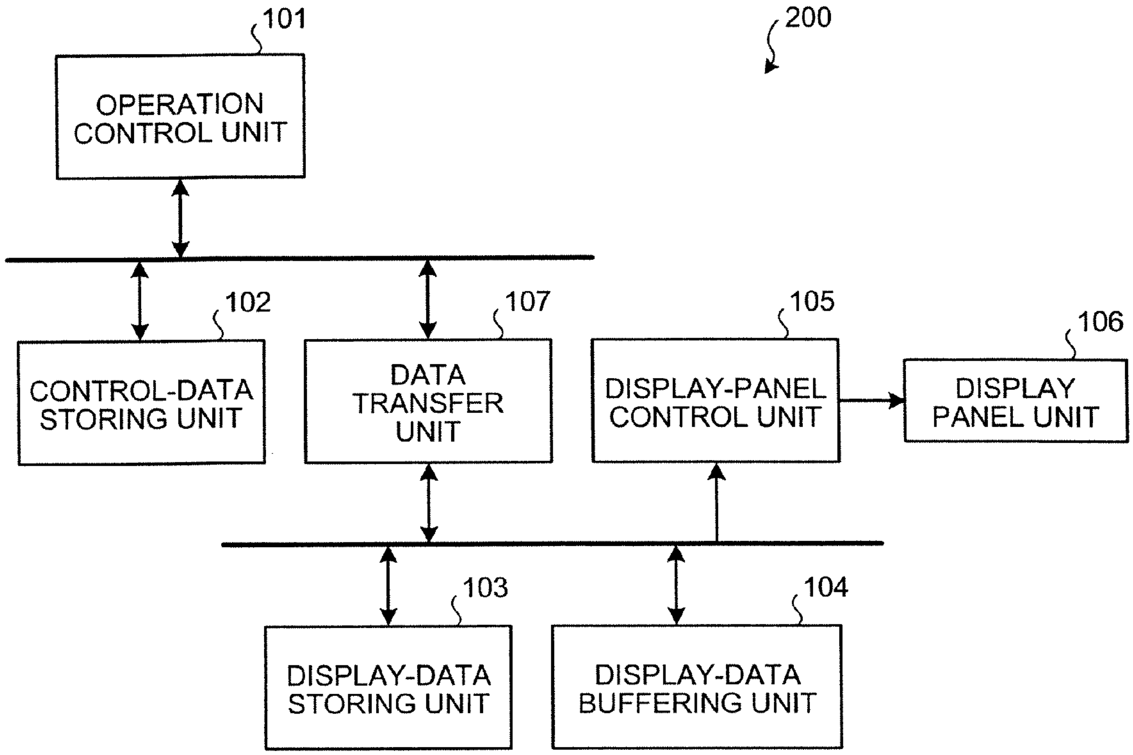
FIG. 13 is a block diagram depicting the structure of a display apparatus of a display apparatus of a multifunction product including a data transfer unit according to another embodiment of the present invention.

In another example, the present invention can be applied to even such a case as that the control-data storing unit 102 at the transfer source and the screen-data storing unit 103 at the transfer destination are connected to different buses. FIG. 13 is a block diagram depicting the structure of a display apparatus of a display apparatus of a multifunction product including a data transfer unit according to another embodiment of the present invention. In this case, image data stored in the control-data storing unit 102 connected to a control bus is transferred to the screen-data storing unit 103 on a display image bus via the data transfer unit 107. The present invention is applied to the data transfer unit 107.

Furthermore, the transfer destination for image data generation can be the display-data buffering unit 104 in place of the screen-data storing unit 103, without changing the structure and operation of the display apparatus.

Here, the operation-unit display control apparatus of a digital multifunction product is taken as an example. The range of application of the present invention is not meant to be restricted to the embodiments. The present invention can be applied to systems, such as a screen display system for various testing apparatuses and an operation terminal for selling tickets, as long as a plurality of pieces of image data are stored as input to a palette table and they are each transferred and then combined together to generate a display screen.

Furthermore, the present invention is not meant to be restricted to the embodiments. The structures and functions in the embodiments can be freely combined.

According to the present invention, a data converting unit color-converts image data stored in a predetermined address space to display image data. A transparency determining unit determines whether a pixel value of the display image data coincides with a pixel value of reference data, the reference data being stored in reference-data storing unit and being for determining, when a display instruction of causing image data to be displayed on a display position where another display data is placed is obtained, whether the display data is overwritten with the image data for display. When it is determined that the pixel value of the display image data coincides with the pixel value of the reference data, a data transfer unit transfers the display image data to a display address space. With this, a data conversion process and a transparent process can be simultaneously performed. Therefore, an effect of reducing a processing time is achieved.

According to the present invention, a setting unit sets whether to perform a transparency determining process on the image data. When it is determined to perform the transparency determining process, the transparency determining unit determines whether the pixel value of the display image data coincides with the pixel value of the reference value. With this, an operator can set whether to perform transparent processing. Therefore, an effect is achieved in which a plurality of processes can be supported by one apparatus.

According to the present invention, an obtaining unit obtains image data in binary representation stored in a predetermined address space, and color information for use in color display of the image data. A data converting unit color-converts the image data to display image data by using the color information. A transparency determining unit determines whether the image data coincides with a reference value in predetermined binary representation. When it is determined that the image data coincides with the reference value, a data transfer unit transfers the display image data to a display address space. With this, a data conversion process and a transparent process can be simultaneously performed. Therefore, an effect of reducing a processing time is achieved.

According to the present invention, a setting unit sets whether to perform a transparency determining process on the image data. When it is determined to perform the transparency determining process, the transparency determining unit determines whether the display image data coincides with the reference value. With this, an operator can set whether to perform transparent processing. Therefore, an effect is achieved in which a plurality of processes can be supported by one apparatus.

According to the present invention, further provided are: a read-start-address register that stores a read-start address of the image data to be sent to the data converting unit; a read-transfer-width register that stores an image width of the image data to be sent to the data converting unit; a transfer-source image-folding-width register that stores an image width of the image data; a the read-address register that stores a the read-address, which is an address of image data being color-converted by the data converting unit, the read-address register with the read-start address being taken as a reference and with a transition being made to a next address one by one for each step of the transfer process; a number-of-read-lines register that stores the number of lines of image data already color-converted. A read-address calculating unit calculates the read-address when the read-address is shifted one by one for each unit of transfer and upon reaching the address set at the read-transfer-width register, by adding one to the number-of-read-lines register and multiplying the number of read lines by an address width set in the transfer-source image-folding-width register. A data reading unit that reads the image data corresponding to the read-address calculated by the read-address calculating unit in the predetermined address space. The data converting unit color-converts the image data read by the read reading unit to the display image data. With this, the image data can be read as that of a rectangular area smaller than an image data area at a transfer source. Therefore, an effect of reducing the memory capacity of a work area is achieved.

According to the present invention, further provided are: a write-start-address register that stores a write start address in the display address space; a write-transfer-width register that stores an image width to be written in the display address space; a transfer-destination folding-width register that stores an image width of the display address space; a write-address register that stores a write-processing-address, which is an address of image data being written in the display address space, the write-processing-address register with the write-start address being taken as a reference and a transition being made to a next address for each step of the transfer process; and a number-of-written-lines register that stores the number of lines of image data already written. Upon reaching an address set at the write-transfer-width register after the write-address is shifted one by one for each unit of transfer, a write-address calculating unit calculates the write-address by adding one to the number-of-written-lines register and multiplying the number of written lines by an address width set in the transfer-destination image-folding-width register. The data transfer unit transfers the display image data to the write-address calculated by the write-address calculating unit in the display address space. With this, the image data can be written in an image area at a transfer destination as being divided into small rectangular areas. Therefore, an effect of reducing the memory capacity of the work area is achieved.

According to the present invention, a data converting unit color-converts image data stored in a predetermined address space to display image data. A transparency determining unit determines whether a pixel value of the display image data coincides with a pixel value of reference data, the reference data being stored in reference-data storing unit and being for determining, when a display instruction of causing image data to be displayed on a display position where another display data is placed is obtained, whether the display data is overwritten with the image data for display. When the pixel value of the display image data coincides with the pixel value of the reference data, a data transfer unit transfers the display image data to cause the display image data to be displayed a display panel. With this, a data conversion process and a transparent process can be simultaneously performed. Therefore, an effect of reducing a processing time is achieved.

According to the present invention, an obtaining unit obtains image data in binary representation stored in a predetermined address space, and color information for use in color display of the image data. A data converting unit color-converts the image data to display image data by using the color information. A transparency determining unit determines whether the image data coincides with a reference value in predetermined binary representation. When it is determined that the image data coincides with the reference value, a data transfer unit transfers the display image data to cause the display image data to be displayed on a display panel. With this, a data conversion process and a transparent process can be simultaneously performed. Therefore, an effect of reducing a processing time is achieved.

According to the present invention, in a data converting step, image data stored in a predetermined address space is color-converted to display image data. In a transparency determining step, it is determined whether a pixel value of the display image data coincides with a pixel value of reference data, the reference data being stored in reference-data storing unit and being for determining, when a display instruction of causing image data to be displayed on a display position where another display data is placed is obtained, whether the display data is overwritten with the image data for display. When it is determined that the pixel value of the display image data coincides with the pixel value of the reference data, in a data transferring step, the display image data is transferred to a display address space. With this, a data conversion process and a transparent process can be simultaneously performed. Therefore, an effect of reducing a processing time is achieved.

According to the present invention, in an obtaining step, image data in binary representation stored in a predetermined address space and color information for use in color display of the image data are obtained. In a data converting step, the image data is color-converted to display image data by using the color information. In a transparency determining step, it is determined whether the image data coincides with a reference value in predetermined binary representation. When it is determined that the image data coincides with the reference value, in a data transferring step, the display image data is transferred to a display address space. With this, a data conversion process and a transparent process can be simultaneously performed. Therefore, an effect of reducing a processing time is achieved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data transfer apparatus comprising:

a reference-data storing unit that stores reference data for determining, when an instruction to display image data stored in a predetermined address space on a same display position as a display position of other display data is received, whether to display the image data by overwriting the display data;

a data converting unit that converts the image data into color converted display image data in a format for display;

a transparency determining unit that determines whether a first pixel value of the color converted display image data obtained through a color conversion by the data converting unit coincides with a second pixel value of the reference data stored in the reference-data storing unit;

a data transfer unit that transfers, when the transparency determining unit determines that the first pixel value coincides with the second pixel value, the display image data to the display address space;

a read-transfer-width register that stores an image width to be sent to the data converting unit from among the image data;

a transfer-source image-folding-width register that stores an image width of the image data;

a read-processing-address register that stores a read-processing address that is an address of image data being converted by the data converting unit, the read-processing-address register taking the read-start address as a reference and shifting to a next address one by one with each step of a transfer process;

a number-of-read-lines register that stores number of lines of the image data already converted;

a read-address calculating unit that calculates the read-processing address by adding one to the number-of-read-lines register upon reaching an address set at the read-transfer-width register with a shift of the read-processing address one by one in units of transfer, and adding a value obtained by multiplying the number of read lines by an address width set in the transfer-source image-folding-width register to the read-start address; and a data reading unit that reads the image data corresponding to the read-processing address calculated by the read-address calculating unit in the predetermined address space, wherein the data converting unit converts the image data read by the data reading unit into the display image data.

2. The data transfer apparatus according to claim 1, further comprising:

a setting unit that sets whether the transparency determining unit performs a transparency determining process on the color converted display image data, wherein when the setting unit sets that the transparency determining process is to be performed on the color converted display image data, the transparency determining unit determines whether the first pixel value coincides with the second pixel value.

3. A data transfer apparatus comprising:

a reference-data storing unit that stores reference data for determining, when an instruction to display image data stored in a predetermined address space on a same display position as a display position of other display data is received, whether to display the image data by overwriting the display data;

a data converting unit that converts the image data into color converted display image data in a format for display;

a transparency determining unit that determines whether a first pixel value of the color converted display image data obtained through a color conversion by the data converting unit coincides with a second pixel value of the reference data stored in the reference-data storing unit;

a data transfer unit that transfers, when the transparency determining unit determines that the first pixel value coincides with the second pixel value, the display image data to the display address space;

a write-start-address register that stores a write-start address in the display address space;

a write-transfer-width register that stores an image width to be written in the display address space;

a transfer-source image-folding-width register that stores an image width of the display address space;

a write-processing-address register that stores a write-processing-address that is an address of image data being written in the display address space, the write-processing-address register taking the write-start address as a reference and shifting to a next address one by one with each step of a transfer process;

a number-of-written-lines register that stores number of lines of image data already written; and a write-address calculating unit that calculates the write-processing address by adding one to the number-of-written-lines register upon reaching an address set at the write-transfer-width register with a shift of the write-processing address one by one for in units of transfer, and adding a value obtained by multiplying the number of read lines by an address width set in the transfer-source image-folding-width register to the write-start address, wherein the data transfer unit transfers the display image data to the write-processing address calculated by the write-address calculating unit in the display address space.

4. The data transfer apparatus according to claim 3, further comprising:

a setting unit that sets whether the transparency determining unit performs a transparency determining process on the color converted display image data, wherein when the setting unit sets that the transparency determining process is to be performed on the color converted display image data, the transparency determining unit determines whether the first pixel value coincides with the second pixel value.

5. A data transfer apparatus comprising:

an obtaining unit that obtains binary image data stored in a predetermined address space and color information for displaying the image data in color;

a data converting unit that converts the image data obtained by the obtaining unit into display image data by using the color information;

a transparency determining unit that determines whether the display image data coincides with a predetermined reference binary value;

a data transfer unit that transfers, when the transparency determining unit determines that the display image data coincides with the reference binary value, the display image data obtained through a color conversion by the data converting unit to a display address space;

a read-start-address register that stores a read-start address to be sent to the data converting unit from among the image data;

a read-transfer-width register that stores an image width to be sent to the data converting unit from among the image data;

a transfer-source image-folding-width register that stores an image width of the image data;

a read-processing-address register that stores a read-processing address that is an address of image data being converted by the data converting unit, the read-processing-address register taking the read-start address as a reference and transiting to a next address one by one with each step of a transfer process;

a number-of-read-lines register that stores number of lines of the image data already converted;

a read-address calculating unit that calculates the read-processing address by adding one to the number-of-read-lines register upon reaching an address set at the read-transfer-width register with a shift of the read-processing address one by one in units of transfer, and adding a value obtained by multiplying the number of read lines by an address width set in the transfer-source image-folding-width register to the read-start address; and a data reading unit that reads the image data corresponding to the read-processing address calculated by the read-address calculating unit in the predetermined address space, wherein the data converting unit converts the image data read by the data reading unit into the display image data.

6. The data transfer apparatus according to claim 5, further comprising:

a setting unit that sets whether to perform a transparency determining process on the image data, wherein when the setting unit sets that the transparency determining process is to be performed on the image data, the transparency determining unit determines whether the display image data coincides with the reference binary value.

7. A data transfer apparatus comprising:

an obtaining unit that obtains binary image data stored in a predetermined address space and color information for displaying the image data in color;

a data converting unit that converts the image data obtained by the obtaining unit into display image data by using the color information;

a transparency determining unit that determines whether the display image data coincides with a predetermined reference binary value;

a data transfer unit that transfers, when the transparency determining unit determines that the display image data coincides with the reference binary value, the display image data obtained through a color conversion by the data converting unit to a display address space;

a write-start-address register that stores a write-start address in the display address space;

a write-transfer-width register that stores an image width to be written in the display address space;

transfer-source image-folding-width register that stores an image width of the display address space;

a write-processing-address register that stores a write-processing-address that is an address of image data being written in the display address space, the write-processing-address register taking the write-start address as a reference and shifting to a next address one by one with each step of a transfer process;

a number-of-written-lines register that stores number of lines of image data already written; and a write-address calculating unit that calculates the write-processing address by adding one to the number-of-written-lines register upon reaching an address set at the write-transfer-width register with a shift of the write-processing address one by one for in units of transfer, and adding a value obtained by multiplying the number of read lines by an address width set in the transfer-source image-folding-width register to the write-start address, wherein the data transfer unit transfers the display image data to the write-processing address calculated by the write-address calculating unit in the display address space.

8. The data transfer apparatus according to claim 7, further comprising:

a setting unit that sets whether to perform a transparency determining process on the image data, wherein when the setting unit sets that the transparency determining process is to be performed on the image data, the transparency determining unit determines whether the display image data coincides with the reference binary value.

* * * * *